US007371090B2

(12) United States Patent
Hashizume

(10) Patent No.: US 7,371,090 B2
(45) Date of Patent: May 13, 2008

(54) MOBILE WIRELESS DEVICE WITH A CONDUCTIVE PART CONNECTED TO A REFERENCE POTENTIAL LAYER

(75) Inventor: Takanori Hashizume, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/361,467

(22) Filed: Feb. 24, 2006

(65) Prior Publication Data

US 2006/0194462 A1 Aug. 31, 2006

(30) Foreign Application Priority Data

Feb. 25, 2005 (JP) ............................. 2005-051110

(51) Int. Cl.
*H01R 3/00* (2006.01)
*H04M 1/00* (2006.01)

(52) U.S. Cl. .................................... 439/164; 455/550.1

(58) Field of Classification Search ................ 439/165, 439/164, 65, 66; 361/814, 752; 174/254; 455/550.1

See application file for complete search history.

(56) References Cited

U.S. PATENT DOCUMENTS

| | | | | |
|---|---|---|---|---|
| 5,027,394 | A * | 6/1991 | Ono et al. | 379/434 |
| 5,799,079 | A * | 8/1998 | Inoue | 379/433.13 |
| 5,832,080 | A * | 11/1998 | Beutler et al. | 379/433.13 |
| 6,149,442 | A * | 11/2000 | Enright | 439/31 |
| 6,255,582 | B1 | 7/2001 | Miller et al. | |
| 6,352,434 | B1 * | 3/2002 | Emmert | 439/65 |
| 6,439,905 | B2 * | 8/2002 | Andrews et al. | 439/165 |
| 6,447,314 | B1 * | 9/2002 | Kato et al. | 439/165 |
| 6,738,122 | B2 * | 5/2004 | Lim | 349/149 |
| 6,872,088 | B2 * | 3/2005 | Watanabe | 439/165 |
| 2002/0135993 | A1 | 9/2002 | Ueyama et al. | |

FOREIGN PATENT DOCUMENTS

| | | | |
|---|---|---|---|
| EP | 1 601 045 | A2 | 4/2002 |
| EP | 1 422 787 | A1 | 5/2004 |
| EP | 1 633 173 | A1 | 3/2006 |
| GB | 0603772.5 | | 8/2006 |
| JP | 2001-284934 | | 10/2001 |
| JP | 2004-104528 | A | 4/2004 |
| JP | 2004-214443 | | 7/2004 |
| JP | 2005-136668 | A | 5/2005 |

* cited by examiner

*Primary Examiner*—Chandrika Prasad
(74) *Attorney, Agent, or Firm*—Hogan & Hartson LLP

(57) ABSTRACT

A mobile wireless device including: first housing, a second housing, a signal line electrically connecting a circuit of the first housing and a circuit of the second housing, and a connection portion for connecting the first housing and the second housing so that they can be opened and closed, wherein ends of the housings have openings communicating with interiors of the housings and through which the signal line passed, the second housing houses an electronic circuit including a wireless unit, the electronic circuit has one end of the signal line connected to it, the first housing houses a circuit board including a reference potential layer, and the circuit board has the other and of the signal line connected to it, a conductive part is arranged from the opening of the first housing up to a position of the circuit board where the signal line is connected, and the conductive part is electrically connected to the reference potential layer of the circuit board.

10 Claims, 11 Drawing Sheets

MOBILE WIRELESS DEVICE WITH A CONDUCTIVE PART CONNECTED TO A REFERENCE POTENTIAL LAYER

BACKGROUND OF THE INVENTION

1. Field of the Invention

The present invention relates to a mobile phone or other mobile wireless device.

2. Description of the Art

A mobile wireless device having two housings connected to each other so that they can be opened and closed is known. For example, Japanese Patent Publication (A) No. 2001-264934 discloses providing a built-in antenna in a hinge portion connecting two housings to prevent a drop in the gain among the antenna characteristics due to the influence of the head of a user.

The signal line electrically connecting the first housing and the second housing such as a small gauge coaxial connecting the main board and the LCD board has an effect upon the antenna characteristics. For example, when arranging the built-in antenna at the lower side of the bottom housing of the mobile wireless device, the area of the ground of the signal line is cramped, so the signal line functions as a coil in terms of high frequency. On the other hand, the signal line changes in shape along with the opening/closing of the mobile wireless device. Accordingly, the antenna characteristics become unstable due to deformation of the signal line along with the opening/closing of the mobile wireless device.

SUMMARY OF THE INVENTION

An object of the present invention is to provide a mobile wireless device able to secure a stable antenna gain.

According to the present invention, theme is provided a mobile wireless device including: a first housing, a second housing, a signal line, and a connection portion for connecting the first housing and the second housing so that they can be opened and closed, wherein ends of the housings have openings communicating with interiors of the housings and through which the signal line passed, the second housing houses an electronic circuit including a wireless unit, the electronic circuit has one end of the signal line connected to it, the first housing houses a circuit board including a reference potential layer, and the circuit board has the other end of the signal line connected to it, a conductive part is arranged from the opening of the first housing up to a position of the circuit board where the signal line in connected, and the conductive part is electrically connected to the reference potential layer of the circuit board.

Preferably, the circuit board includes an electronic component receiving power from the circuit board, and the conductive part in a part holder holding the electronic component, fixed to the opening side end inside the first housing, and having conductivity.

Preferably, the conductive part is a conductive treated part formed at the inner surface of the first housing at least near the opening by coating a conductive paint or depositing a metal film. Note that the metal film deposition includes for example vapor deposition, plating, and sputtering.

Preferably, the circuit board includes an electronic component receiving power from the circuit board, the conductive part has a first conductive part constituted by a conductive treated part formed an the inner surface of the first housing at least near the opening by coating a conductive paint or depositing a metal film and a second conductive part constituted by a part holder holding the electronic component and fixed to the opening side end inside the first housing, and the part holder is fastened together with the conductive treated part by screws.

Preferably, one of the circuit board and the conductive treated part includes a spring contact and the other includes a plate contact, the first housing is constituted by a plurality of case members, the plurality of case members are assembled so as to make the spring contact and the plate contact contact each other and electrically connect the reference potential layer and the conductive treated part, and a direction in which the plurality of case members are assembled matches with a direction raising a contact pressure of the spring contact and the plate contact.

Preferably, the electronic component is a camera.

Preferably, the second housing has an antenna connected to the wireless unit and the antenna is arranged at a position where it does not overlap with the conductive part when the first housing and the second housing are closed.

Preferably, the connection portion includes a first hinge portion provided at the first housing and having a hole opening to the inside of the first housing, a second hinge portion provided at the second housing and having a hole opening to the inside of the second housing, and a cylindrical hinge part passed through the holes of the first hinge portion and the second hinge portion, and the signal line is passed through the hinge parts.

According to the mobile wireless device of the present invention, a stable antenna gain can be secured.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
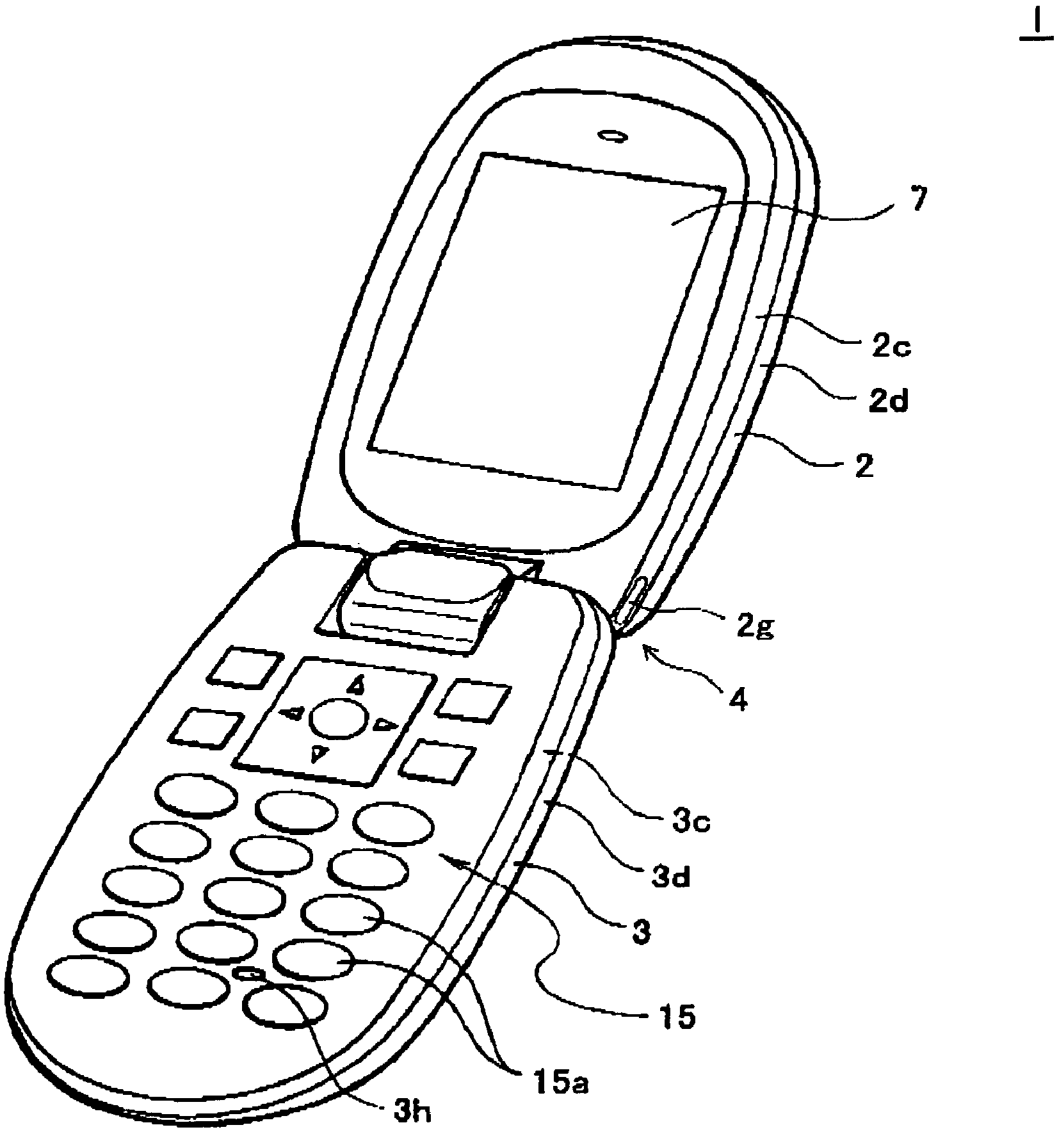
FIG. 1 is a perspective view of the outer appearance of a mobile phone of a first embodiment of the present invention in an opened state.
Figure 2:
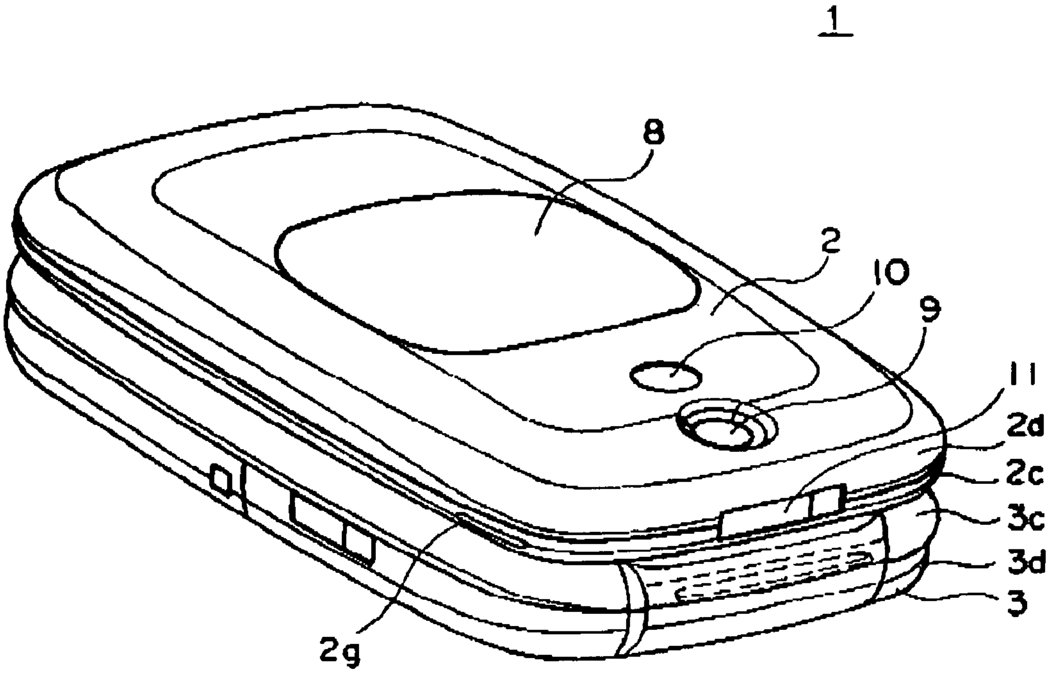
FIG. 2 is a perspective view of the outer appearance of the mobile phone of FIG. 1 in a closed state.

FIG. 1 and FIG. 2 are perspective views of the outer appearance of an embodiment of a mobile wireless device to which the present invention is applied. The mobile phone 1 is constituted as a so-called flip-open type mobile phone. FIG. 1 shows a closed state, while FIG. 2 shows an opened state.

The mobile phone 1 is provided with a first housing 2 and a second housing 3. The first housing 2 and the second housing 3 are connected by a connection portion 4 so that they can be opened and closed pivoting about the connection portion 4. The first housing 2 and the second housing 3 are provided with front surface cases 2*c* and 3*c* on the surfaces (front surfaces) facing each other in the closed state and back surface cases 2*d* and 3*d* on their back surfaces. The front surface and back surface cases 2*c*, 3*c*, 2*d*, and 3*d* are formed so that their contours schematically mate with each other when viewed from one other housing to the other housing in the closed state. These cases are integrally formed by for example plastic.

The first housing 2 is provided with a main display unit 7 for displaying an image on the front surface and a sub display unit 8 for displaying an image on the back surface in a flush manner with those surfaces. The main display unit 7 and the sub display unit 8 are constituted by for example liquid crystal displays.

Further, the first housing 2 is provided with an imaging unit 9 with an imaging lens exposed on the back surface and a strobe 10 emitting light from the back surface. An operating part 11 for switching an imaging mode of the imaging unit 9 from a normal imaging mode to macro imaging is provided at the end of the first housing 2 on the connection portion 4 side.

The connection portion 4 side of the front surface case 2*c* of the first housing 2 is provided with holes 2*g* and 2*h* (see FIG. 7) for securing the sound path of a speaker built-in the first housing 2. Holes 2*g* are provided in an elongated state at the two side surfaces of the front surface case 2*c*, while two holes 2*h* are provided at the front surface of the front surface case 2*c* straddling the connection portion.

The second housing 3 is provided with an operating panel 15 on the front surface. The operating panel 15 includes tenkey button 15*a* and other various types of buttons for operating the mobile phone 1. Further, the front surface of the second housing 3 is provided with a hole 3*h* for securing the sound path to a microphone.

Figure 3:
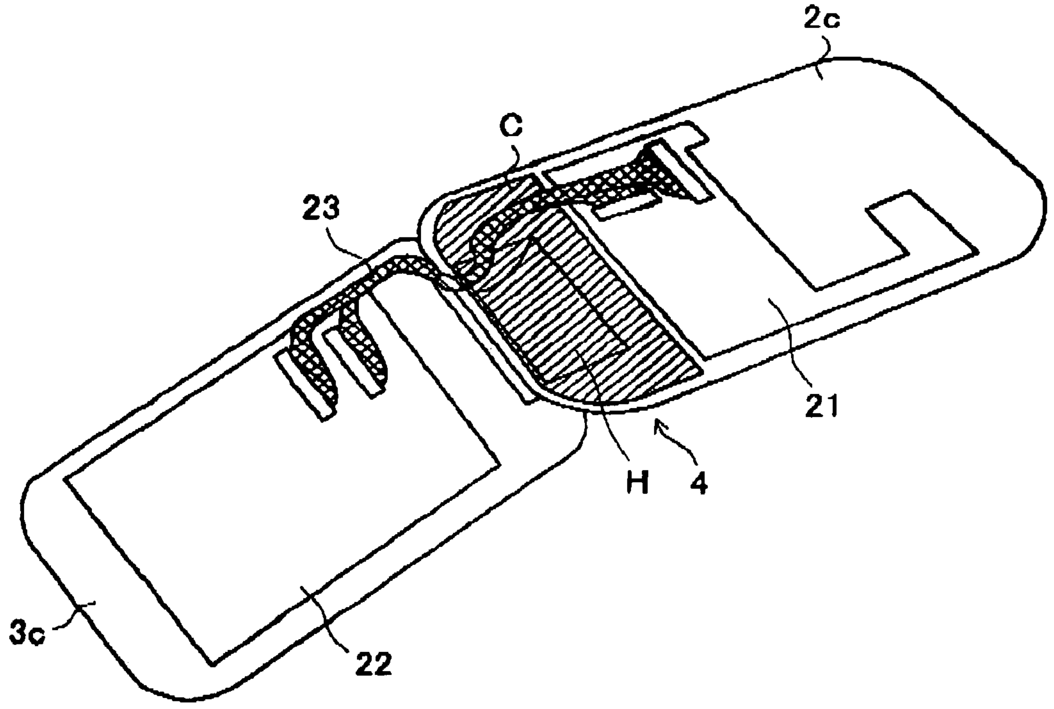
FIG. 3 is a view showing the outine of the mobile phone of FIG. 1.

FIG. 3 is a view showing the outine of the first embodiment. It is a perspective view of the mobile phone 1 in the opened state seen from the back surface after detaching the back surface cases 2*d* and 3*d* and some other parts from the mobile phone 1.

The first housing 2 and the second housing 3 house circuit boards constituted by an LCD board 21 and a main board 22. The LCD board 21 and the main board 22 are electrically connected by a signal line 23. The signal line 23 is passed through an opening H connecting the first housing 2 and the second housing 3. The signal line 23 changes in overall shape along with the opening/closing of the first housing 2 and the second housing 3. In particular, the shape changes by banding and twisting along with the opening/closing near the opening H.

Therefore, as indicated by the hatching in FIG. 3, a conductive part C is arranged over a relatively wide range in a space from the position where the signal line 23 is connected to the LCD board 21 up to the opening H. At the same time, the conductive part C is electrically connected to a reference potential layer of the LCD board 21. Due to this, the signal line 23 is prevented from appearing as a coil floating in the air. Below, details will be explained.

Figure 4:
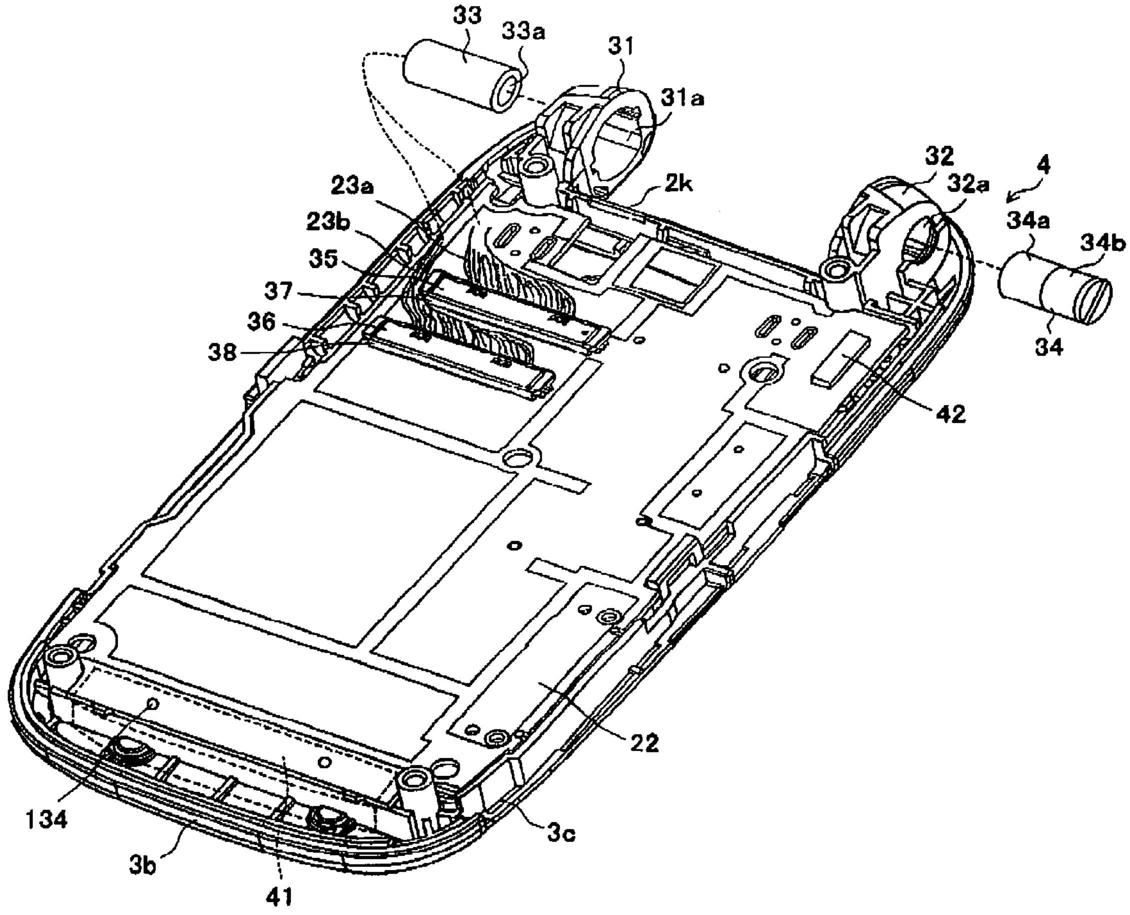
FIG. 4 is a perspective view of an inside of a second housing of the mobile phone of FIG. 1.

FIG. 4 is a view of the inside of the second housing 3 with some parts omitted and a perspective view seen from the back surface (same direction as FIG. 3).

The end of the second housing 3 on the connection portion 4 side of the front surface case 3*c* is provided with a recess 2*k* into which a first hinge portion 30 of the first housing 2 (see FIG. 6) explained later is fit. A second hinge portion 31 and a third hinge portion 32 are formed on the two sides of the recess 2*k*. The second hinge portion 31 and the third hinge portion 32 are provided with a hole 31*a* and a hole 32*a* through which a first hinge part 33 and a second hinge part 34 for connecting these hinge portions and the first hinge portion pass. Note that when the front surface case 3*c* is covered by the back surface case 3*d*, it is covered by the back surface case 3*d* except at the recess 2*k* side of the second hinge portion 31 and the third hinge portion 32, and the holes 31*a* and 32*a* open to the inside of the second housing 3.

The first hinge part 33 is formed in for example a cylindrical shape, is provided fixed with respect to the second hinge portion 31, and is provided rotatably with respect to the first hinge portion 30. The second hinge part 34 is formed including a not shown click mechanism for causing a click feeling along with the opening/closing of the mobile phone 1, is provided with a part 34*a* provided fixed with respect to the first hinge portion 30, and a part 34*b* provided fixed with respect to the third hinge portion 32. The part 34*a* and the part 34*b* can rotate relative to each other. Note that these first hinge part 33 and second hinge part 34 may be constituted by a conductive material.

The main board 22 has an area of the same extent as the front surface case 3*c* and arranged stacked over the front surface case 3*c*. The main board 22 is constituted as a multilayer type printed circuit board including for example a pattern layer, an insulation layer, a ground layer, and a power supply layer and has various types of circuits such as a not shown high frequency circuit arranged thereon. Note that the ground layer functions as the reference potential layer.

Note that between the main board 22 and the front surface case 3*c*, a shield case (not shown) having an area of substantially the same extent as the main board 22 and blocking electromagnetic waves emitted from the circuits on the main board 22 or entering from the outside and a flexible printed circuit board (not shown) provided with depression switches corresponding to the operating buttons 15*a* are provided. The shield case is electrically connected to the ground layer of the main board 22.

The signal line 23 is provided with cables 23*a* and 23*b* constituted by so-called small-gauge coaxial cables made of bundles of small-gauge coaxial lines. Connectors 35 and 36 are provided at the ends of the cables 23*a* and 23*b* on the second housing 3 side. The signal line 23 and the main board 22 are electrically connected by plugging the connectors 35 and 36 into connectors 37 and 38 provided on the main board 22. The signal line 23 is passed through the hole 33*a* of the hinge part 33 passed through the second hinge portion 31 and extended from the inside of the second housing 3 to the inside of the first housing 2.

The second housing 3 is provided with a main antenna part 41 and a sub antenna part 42 inside. The main antenna part 41 is provided at the end 3*b* of the second housing 3 on the opposite side (opening/closing side) from the connection portion 4, while the sub antenna part 42 is provided at one side at the connection portion 4 side of the second housing 3. The main antenna part 41 is used for transmission/reception etc. of voice and mail and is in constant use. The sub antenna part 42 in utilized when a specific application is activated and the amount of communication increases ouch as when music is downloaded and played back. That is, when a specific application is activated, the antenna part 41 and the sub antenna part 42 are utilized as a diversity antenna.

Figure 5A:
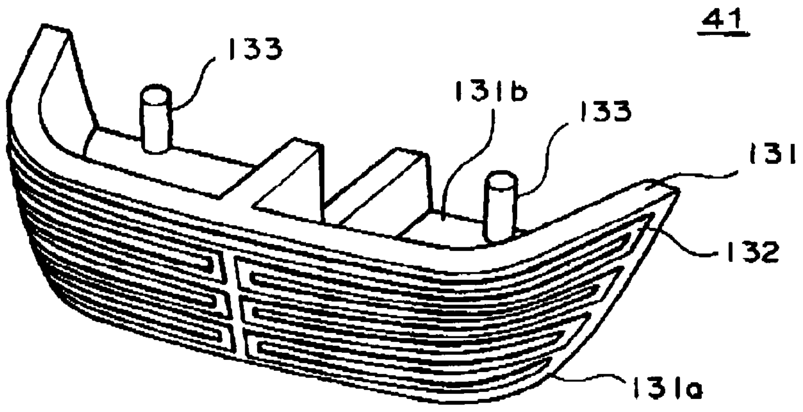
FIGS. 5A and 5B are views of a main antenna part of the mobile phone of FIG. 1.
Figure 5B:
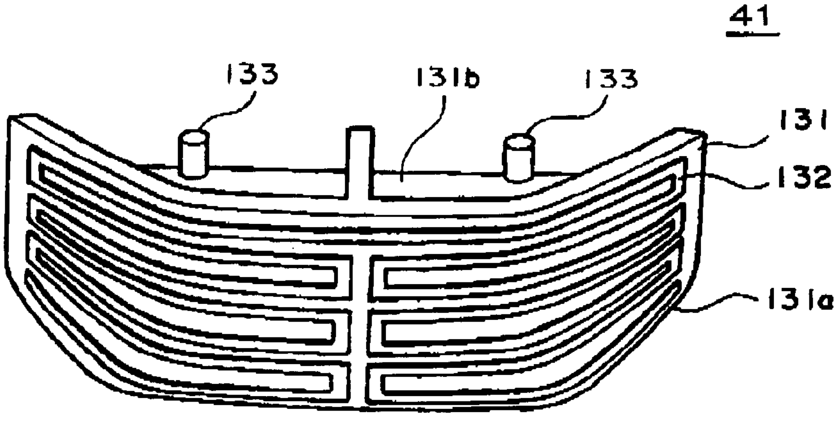

FIG. 5A is a perspective view of the antenna part 41 seen from the front surface of the second housing 3 (the vertical direction of FIG. 5A is reversed from FIG. 4), and FIG. 5B is a view of the antenna part 41 seen from a little above the opening/closing side. The antenna part 41 is provided with a base part 131 attached to the main board 22, an antenna element 132 arranged in the base part, and a power terminal 133 for supplying electric power to the antenna element 132.

The base part 131 is formed by a plastic or another nonconductive member and has a curved surface 131*a* facing an inner wall of the end 3*b* of the second housing 3 on the opening/closing side (see FIG. 4) and a frame part 131*b* provided inside the curved surface 131*a*. The curved surface 131*a* is formed as for example a curved surface facing from the direction on the back surface of the second housing 3 to the direction on the opening/closing side and exhibiting a convex state on the opening/closing side when seen from the back surface and is arranged at the outside of the not shown shield case.

The frame part 131*b* is formed so as to abut against the back surface of the main board 22 (above the sheet surface of FIG. 4) and the end on the opening/closing side of the main board 22. Power terminals 133 are provided on the frame part 131*b* at positions facing the back surface of the main board 22. The power terminals 133 are electrically connected to power terminals 134 (see FIG. 4) provided on the back surface of the main board 22.

The antenna element 132 is obtained by forming phosphorus bronze or other sheet metal into a predetermined pattern shape and is provided so as to be laid snaking back and forth around the entire surface of the curved surface 131*a*.

Figure 6:
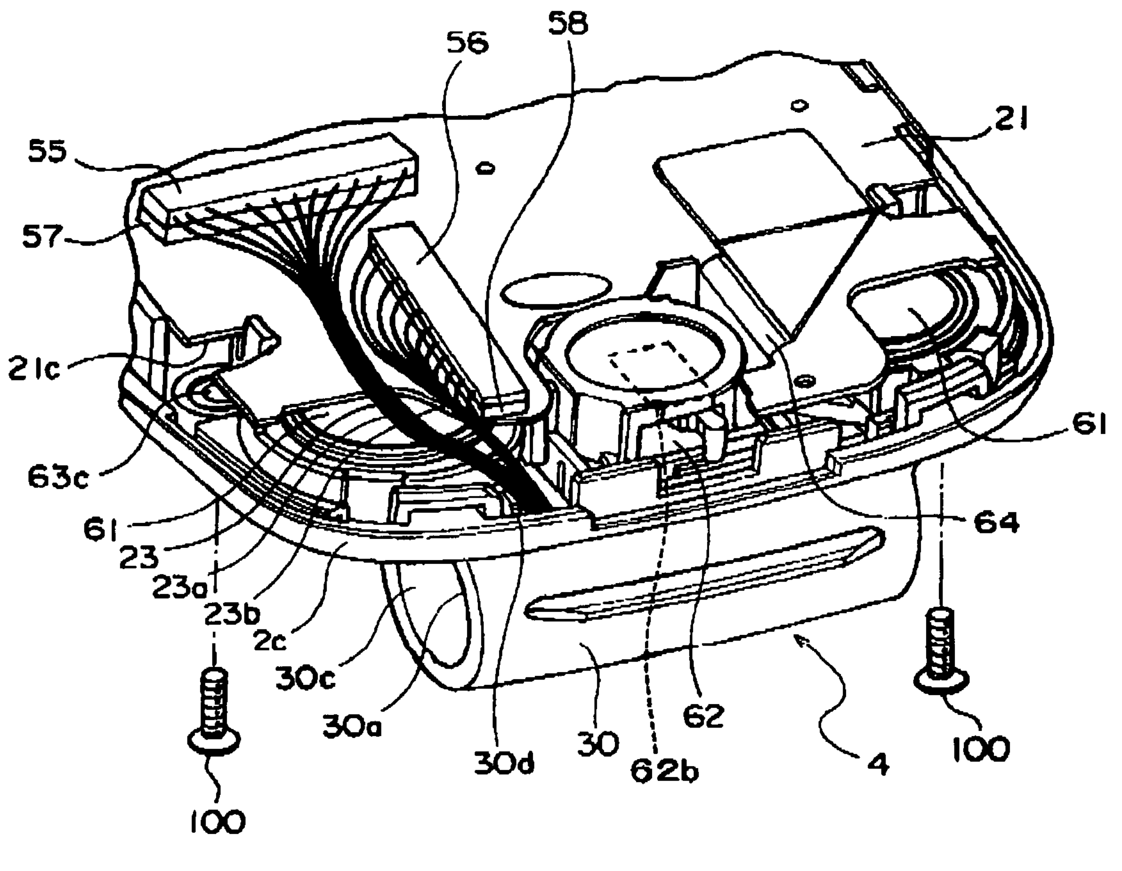
FIG. 6 is a perspective view of an inside around a connection portion of the first housing of the mobile phone of FIG. 1.

FIG. 6 is a view of the inside of the connection portion 4 side of the first housing 2 with some parts omitted and is a perspective view seen from the back surface (same direction as FIG. 3).

The first hinge portion 30 is provided at the end of the first housing 2 on the connection portion 4 side of the front surface case 2*c*. The first hinge portion 30 projects out to the front surface side (downward in the figure) from the front surface case 2*c* and is formed in a cylindrical shape about the pivoting axes of the first housing 2 and the second housing 3. The first hinge portion 30 is formed with a hollow portion 30*a*, holes 30*c* opening from the hollow portion 30*a* to the outside of the housing at the two end faces of the cylinder, and a hole 30*d* opening from the hollow portion 30*a* to the inside of the housing in the side surface of the cylinder.

The hinge parts 33 and 34 (see FIG. 4) are inserted into the holes 30*c*. The signal line 23 passed through the hinge part 33 passes through the corresponding hole 30*c* via the hinge part 33, passes through the hollow portion 30*a* and the hole 30*d*, and and extends to the inside of the first housing 2. Connectors 55 and 56 are provided at the ends of the cables 23*a* and 23*b* of the signal line 23 on the first housing 2 side. The signal line 23 and the LCD board 21 are electrically connected by plugging the connectors 55 and 56 into the connectors 57 and 58 provided on the LCD board 21. Note that the hole 30*d* functions as the opening H explained in FIG. 3.

The LCD board 21 has a width of the same extent as the front surface case 2*c* of the first housing 2 and is laid over the front surface case 2*c*. The LCD board 21 is constituted as a multilayer type printed circuit board including for example a pattern layer, an insulation layer, a ground layer, and a power supply layer. The main display unit 7 and the sub display unit 8 are connected to it via a flexible printed board etc.

The first housing 2 is provided with speakers 61, a camera unit 62, and a part holder 63 for holding the speakers 61 and the camera unit 62 at the end on the connection portion 4 side. The speakers 61 are utilized for announcing an incoming call and playing music. The speakers 61 are formed in for example substantially columnar shapes as a whole, have sound emitting parts at their and faces on the front surface side (downward in FIG. 6) and contacts 61*a* (see FIG. 8) at their end face on the back surface side, and are connected with the LCD board 21 by the contacts 61*a* contacting the pattern layer of the LCD board 21. The camera unit 62 is provided with a not shown imaging lens on the back surface side. Further, the camera unit 62 includes an imaging element 62*b*. The imaging element 62*b* is connected to the LCD board 21 via a flexible printed circuit board (FPC) 64.

Figure 7:
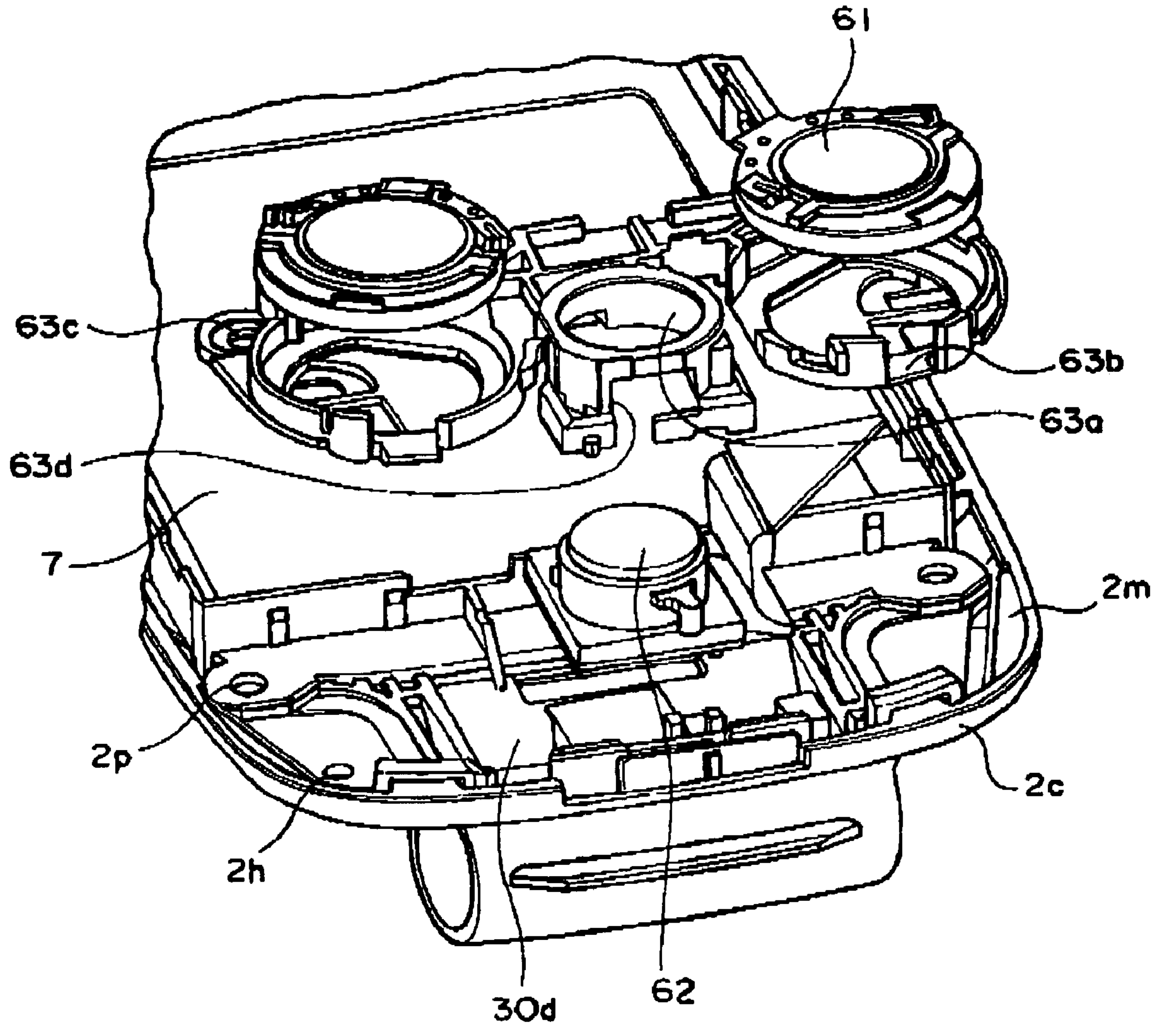
FIG. 7 is a disassembled perspective view of the inside around the connection portion of the first housing of the mobile phone of FIG. 1.
Figure 8:
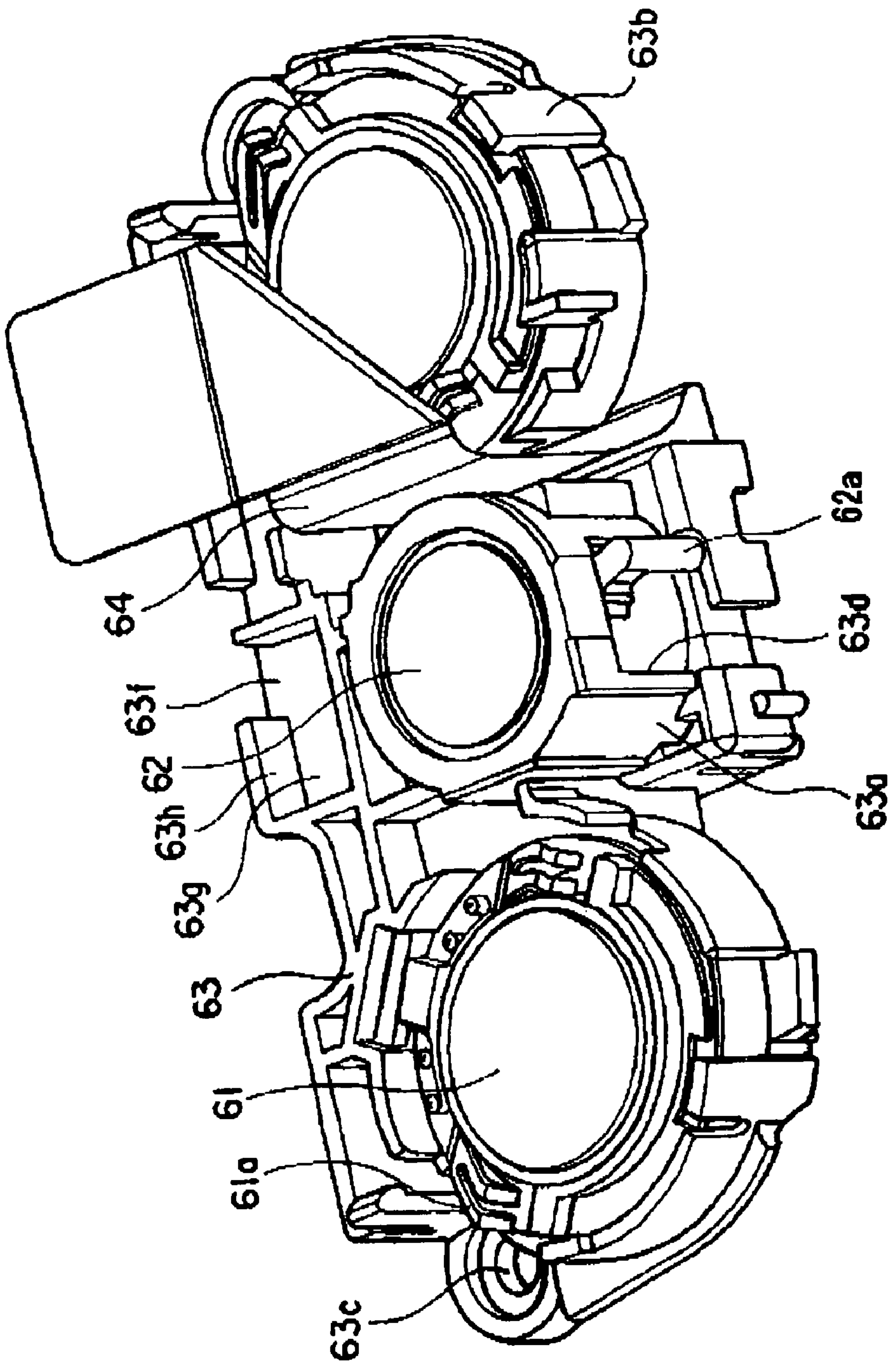
FIG. 8 is a perspective view of a part holder of the mobile phone of FIG. 1.

FIG. 7 is a disassembled perspective view of the vicinity of the part holder 63, while FIG. 8 is a perspective view showing a state where the speakers 61 and the camera unit 62 are held by the part holder 63.

As shown in FIG. 7, the part holder 63 is provided with a camera holding part 63*a* having a recess in which the camera unit 62 is inserted at the center of the front surface case 2*c* side (downward in FIG. 7) and speaker holding parts 63*b* having recesses in which the speakers 61 are inserted on the two sides of the camera holding part 63*a* on the back surface case 2*d* side (upward in FIG. 7). Note that the camera holding part 63*a* and the speaker holding parts 63*b* are provided at their bottoms with holes having smaller diameters than the diameters of the recesses. Further, the front surface case 2*c* is provided at its inside side with a holder holding part 2*m* having a recess in which the part holder 63 may be inserted.

When assembling the first housing 2, the speakers 61 and the camera unit 62 are inserted into the part holder 63 as shown in FIG. 8, then the part holder 63 is inserted into the front surface case 2*c*. Then, as shown in FIG. 6, metal screws 100 are passed through notches 21*c* of the LCD board 21, holes 63*c* of the part holder 63, and holes 2*p* (see FIG. 7) provided in the front surface case 2*c* and screwed into not shown screw bosses arranged inside the housing of the back surface case 2*d*. By this, the part holder 63 and the front surface case 2*c* are fastened together with the LCD board 21 sandwiched between the front surface case 2*c* and the back surface case 2*d*.

Due to this, the vicinity of the first hinge portion 30 of the front surface case 2*c* given conductivity as explained later and the part holder 63 given conductivity in the same way are screwed together, so the contact surfaces can be strongly secured and thus reliable electrical connection can be achieved.

As shown in FIG. 7, the hole 30*d* of the first hinge portion 30 opens to the bottom of the holder holding part 2*m* (surface on the front surface side). Further, as shown in FIG. 6, the opening area of the hole 30*d* is narrowed by the part holder 63. The signal line 23 is passed through the narrowed opening. Accordingly, the part holder 63 also acts as a positioning member of the signal line 23. At the time of assembly, the part holder 63 is inserted in the holder holding part 2*m* in the state with the signal line 23 passed through the hole 30*d*.

Conductivity is imparted to the entire hole 30*d* of the front surface case 2*c* (including the hollow portion 30*a* and the holes 30*c*) and the location from the hole 30*d* including the holder holding part 2*m* and the vicinity of the hole 2*p* up to the position at which the main display unit 7 is attached. Further, substantially all of the part holder 63, including the contact surface in the vicinity of the hole 63*c* of the part holder 63 contacting the hole 2*p* at the time of assembly of the part holder 63 into the front surface case 2*c*, is given conductivity.

For example, the inside of the front surface case 2*c*, in particular the hinge side, is given conductivity by metal vapor deposition, coating a conductive paint containing a metal or other conductive material, sputtering, plating, or the like to make the inside of the housing conductive. Further, the part holder 63 has conductivity as a whole by being formed from metal or by being formed by a plastic or other nonconductive material and being metallized by vapor deposition, plating, or sputtering or being coated with a conductive paint.

Further, the back surface of the main display unit 7, while not particularly shown, is covered by sheet metal. By the assembly of this into the front surface case 2*c*, when viewing the first housing 2 from the second housing 3 side, the vicinity of the first hinge portion 30 of the front surface case 2*c*, the part holder 63, and the sheet metal on the back surface of the main display unit 7 are continuous and form a shield from the signal line 23 in terms of high frequency.

By being fastened together by the metal screws 100 as explained above, the holder holding part 2*m* and the part holder 63 are electrically connected to the ground layer of the LCD board 21. Namely, the holder holding part 2*m* and the part holder 63 function as the conductive part C explained in FIG. 3. The holder holding part 2*m* functions as the conductive treated part of the present invention. Note that conductivity may also be imparted to just one of the holder holding part 2*m* and the part holder 63 as well. Further, the antenna element 132 of the main antenna part 41 is provided at the opening/closing side end, and the conductive part C is provided at the end of the connection portion 4 side, therefore the the two fo not overlap in the closed states.

An shown in FIG. 8, the camera unit 62 has an operating part 62*a* for switching the imaging mode between the normal mode and the macro imaging mode. The operating part 62*a* projects out to the connection portion 4 side to enable operation by sliding the operating part 11 (see FIG. 2) along the end. The camera holding part 63*a* of the part holder 63 is provided with a notch 63*d*. The operating part 62*a* is passed through the notch 63*d* and abuts against the operating part 11. The range of movement of the operating part 62*a* is controlled by the notch 63*d*.

The notch 63*d* is formed by cutting away part of the front surface ease 2*c* side of the camera holding part 63*a*. It is formed so that an opening width w1 on the front surface case 2*c* side of the notch 63*d* is larger than the width of the operating part 62*a* and smaller than a width w2 of the portion for controlling the range of movement of the operating part 62*a*. Accordingly, at the time of assembly, the operating part 62*a* can be inserted into the notch 63*d* from the front surface case 2*c* side and flow of static electricity into the camera unit 62 via the notch 63*d* is prevented.

Figure 9A:
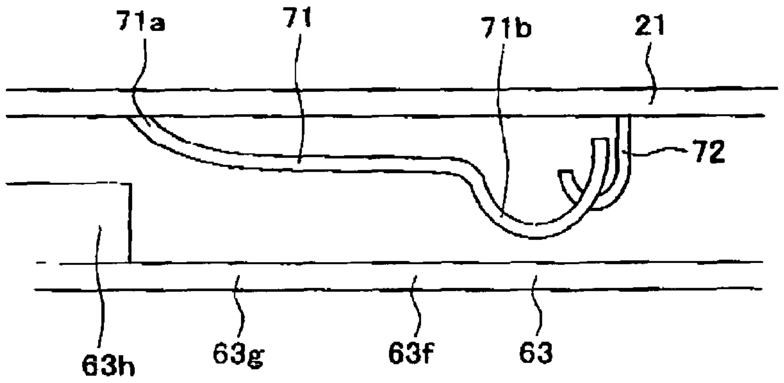
FIGS. 9A and 9B are side views showing a spring contact of the mobile phone of FIG. 1.
Figure 9B:
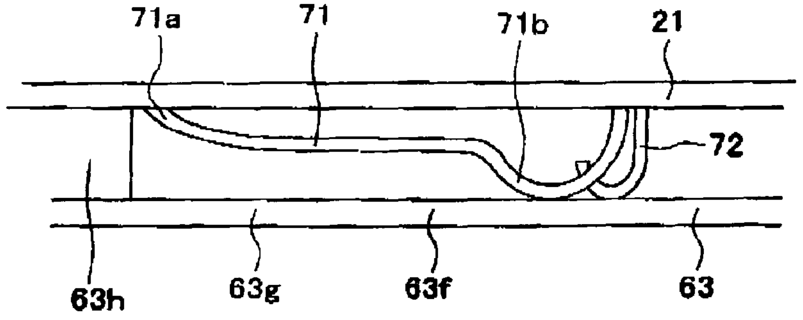

FIGS. 9A and 9B are side views showing a spring contact 71 provided on the LCD board 21 and a plate contact 63*f* provided on the part holder 63 and contacting the spring contact 71. FIG. 9A shows the state before the assembly of the mobile phone 1, and FIG. 9B shows the state after the assembly of the mobile phone 1. The spring contact 71 and the plate contact 63*f* are for obtaining more reliable electric connection of the LCD board 21 and the part holder 63. Note that it is also possible to omit the spring contact 71 and the plate contact 63*f*. The front surface case 2*c* and the part holder 63 function as case members of the present invention.

As shown also in FIG. 8, the part holder 63 has a planar portion 63*g* parallel to the LCD board 21 and a wall portion 63*h* perpendicular to the planar portion 63*g* and supporting the LCD board 21. The plate contact 64*f* is formed at the planar portion 63*g* from which the wall portion 63*h* is cut.

The spring contact 71 is for example formed by a metal plate spring. One end 71*a* is fixed to the LCD board 21 and is electrically connected to the ground layer of the LCD board 21. As shown in FIG. 9A, when there is no load, the spring contact 71 extends in a direction away from the LCD board 21 while being inclined with respect to the LCD board 21 as a whole. A curved portion 71*b* projecting out to the part holder 63 side is formed on the other end. Note that the amount of projection of the curved portion 71*b* to the part holder 63 side is the same extent or slightly smaller than the height of the wall portion 63*h*. Note that a stopper 72 stops movement of the spring contact 71 in the part holder 63 direction and is inserted in a not shown elongated hole provided in the curved portion 71*b*.

As shown in FIG. 9B, when the LCD board 21 is fixed to the part holder 63, the curved portion 71*b* of the spring contact 71 and the part holder 63 contact, so the part holder 63 is electrically connected to the ground layer of the LCD board 21 via the spring contact 71. The curved portion 71*b* contacts the part holder 63 with a predetermined contact pressure by a recovery force of the spring contact 71.

Note that the assembly direction of the front surface case 2*c* and the back surface case 2*d* and the contact direction of the spring contact 71 and the plate contact 63*f* substantially coincide. Due to this, as previously explained, when the vicinity of the first hinge portion 30 of the front surface case 2*c* and the part holder 63 given conductivity in the same way are screwed together sandwiching the LCD board 21 therebetween, the contact pressure of the spring contact 71 and the plate contact 63*f* rises and more reliable electrical connection can be achieved. Further, since the part holder 63 and the vicinity of the first hinge portion 30 of the front surface case 2*c* are made conductive, substantially both of the part holder 62 and the vicinity of the first hinge portion 30 of the front surface case 2*c* are electrically connected to the ground layer.

Figure 10:
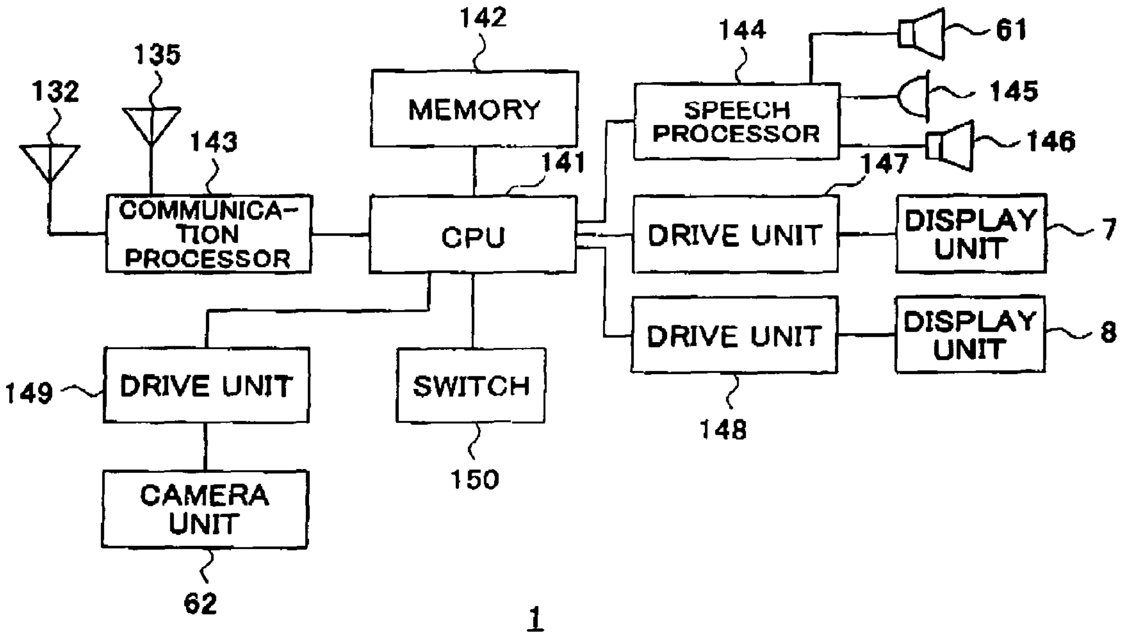
FIG. 10 is a block diagram of an example of the configuration of a signal processing system of the mobile phone of FIG. 1.

FIG. 10 is a block diagram showing an example of the configuration of a signal processing system of a mobile phone 1. The mobile phone 1 is provided with a CPU 141, memory 142, communication processor 143, antenna element 132 of the main antenna part 41, antenna element 135 of the sub antenna part 42, speech processor 144, microphone 145, conversation use speaker 146, speakers 61, main display unit 7, sub display unit 8, and camera unit 62. Note that the communication processor 143 functions as the wireless unit.

The CPU 141 and the memory 142 are configured an for example ICs provided on the main board 22, perform predetermined computations based on signals from various types of means, and execute the control of various types of means. Note that, as the means for outputting a signal to the CPU 141, for example a switch 150 operated by the operating part 15*a* is included.

The communication processor 143 is constituted including a high frequency circuit, modulates various types of data such as voice data and image data processed at the CPU 141 for wireless communication utilizing electric waves, and transmits the same via the antenna elements 132 and 135. Further, the communication processor 143 demodulates the signals received via the antenna elements 132 and 135 and outputs the results to the CPU 141.

The speech processor 144 converts voice data from the CPU 141 to a voice signal, outputs the same to the speakers 146 and 61, or converts the voice signal from a microphone 145 to voice data, and outputs the same to the CPU 141.

Drive units 147, 148, and 149 control the main display unit 21, the sub display unit 22, and the camera unit 62 based on signals from the CPU 141.

According to the above embodiment, by imparting conductivity to the part holder 63 and the holder holding part 2*m* and electrically connecting them to the ground layer of the LCD board 21, the signal line becomes invisible in terms of high frequency due to the part holder 63 and the holder holding part 2*m*. That is, even when the mobile phone 1 is opened and closed, almost no change occurs in the entire length etc. where the antenna can be seen, therefore a stable antenna gain is secured.

Figure 11B:
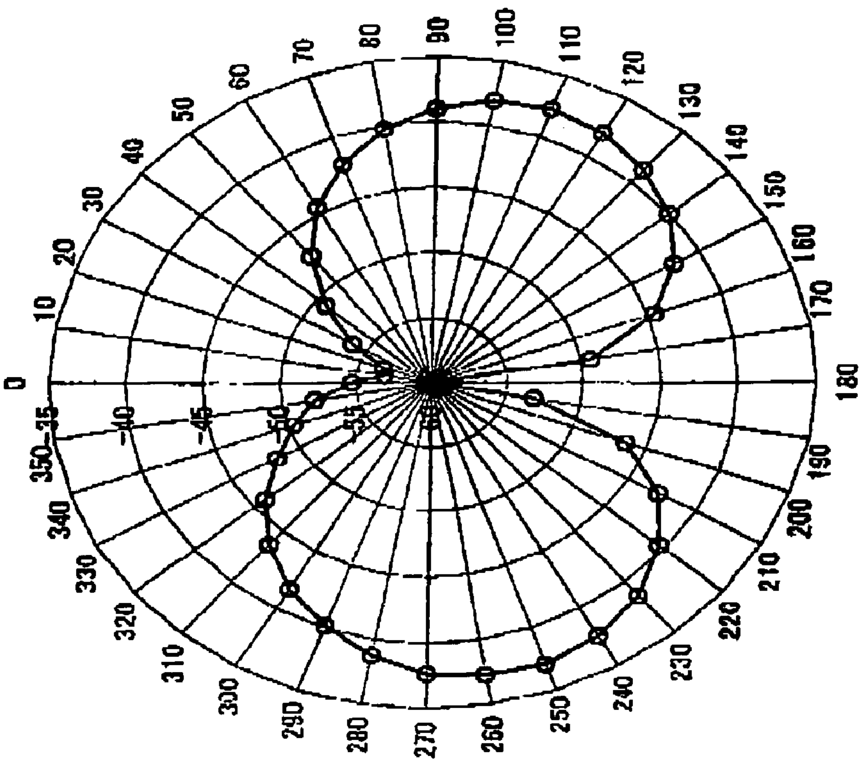
FIGS. 11A and 11B are diagrams showing antenna characteristics of the mobile phone of FIG. 1.
Figure 11A:
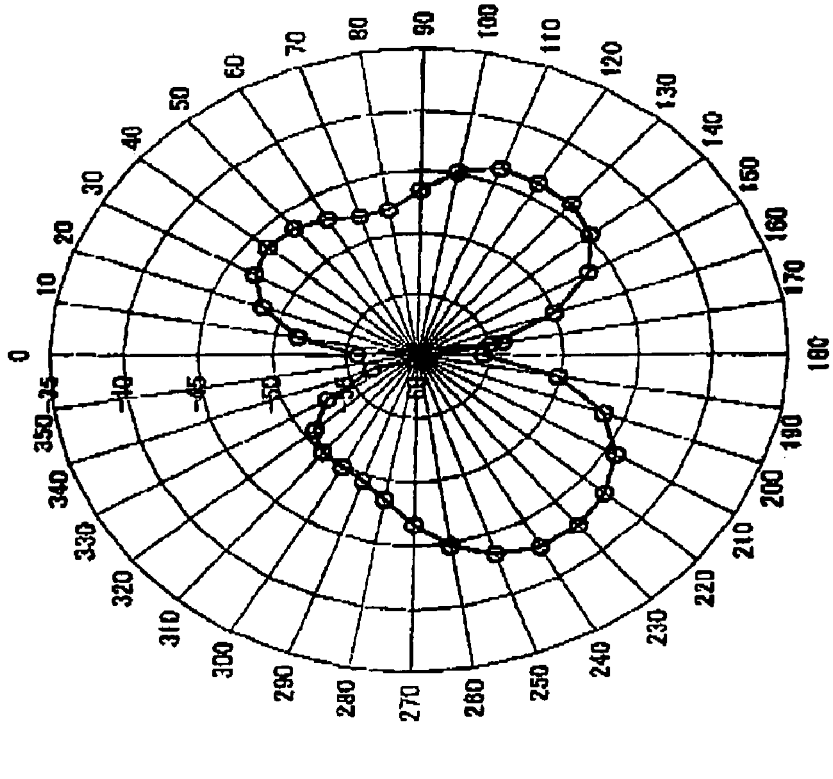

FIGS. 11A and 11B are diagram showing antenna characteristics in a conventional mobile phone and antenna characteristics in the mobile phone 1 of the present embodiment in comparison. FIG. 11A shows the conventional antenna characteristics, and FIG. 11B shows the antenna characteristics of the present embodiment. The axes in the circumferential direction indicate the direction with respect to the mobile phone, where 0 degree and 180 degrees indicate directions of the side surfaces of the mobile phone 1 and 90 degrees and 270 degrees indicate directions of the front surface and the back surface of the mobile phone 1. The axes in the diameter direction indicate intensities of signals transmitted from the antenna. As shown in FIGS. 11A and 11B, by imparting conductivity to the part holder 63 and the holder holding part 2*m*, regularity occurs in the change of the intensity in the circumferential direction, so it is seen that a stable antenna gain is obtained. Further, the signal intensity becomes strong as a whole, and the antenna gain is improved.

By imparting conductivity to the part holder 63 and the vicinity of the first hinge portion 30 of the front surface case 2*c*, it is not necessary to newly provide a space for providing a conductor or change the change etc. of the housing. Further, direct connection of the ground of a small-gauge coaxial line and the ground of the LCD board 21 can be considered, but in order to reduce emissions from the ground of a small-gauge coaxial line to the smallest limit, it is necessary to ground the small-gauge coaxial line at a position about half its length. However, fixing the ground of the small-gauge coaxial line at the center portion in the hinge structure means reduction of slack of the small-gauge coaxial line by the opening/closing of the mobile phone 1 and leads to a breakage of the small-gauge coaxial line.

The part holder 63 holds the camera 62 etc., therefore acts also as a shield of the camera 62 etc. Further, the part holder 63 is assembled into the front surface case 2*c* after various relatively small devices such as the camera 62 are assembled into it, therefore the assembly work becomes easy.

The present invention is not limited to the above embodiment and may be executed in various aspects.

The mobile wireless device is not limited to a mobile phone. The mobile wireless device need only the first housing and the second housing connected so that they can be opened and closed, and the wireless unit. For example, the device may be a notebook PC provided with a wireless unit as well. Further, the first housing and the second housing need only be ones where the wireless unit is provided in at least one and where the circuit of the first housing and the circuit of the second housing are electrically connected to each other. For example, one housing may have both of the display unit and the wireless unit as well.

The signal line need only be one which electrically connects the board and electronic components inside the first housing and the board and the electronic components of the second housing and which deform along with the opening/closing of the communication wireless device. It is not limited to a small-gauge coaxial cable. For example, it may be a flexible printed circuit board as well.

The electronic components held by the part holder include all sorts of members which receive power from the circuit board and not limited to the speakers and camera. For example, they may include a motor for announcing an incoming call to the user.

The conductive treated part is not limited to the portion for holding the parts on the holder. It may be the vicinity of the opening through which the signal line is passed as well. For example, conductive paint may be coated on an area half or two times the area of the part holder.

While the invention has been described with reference to specific embodiments chosen for purpose of illustration, it should be apparent that numerous modifications could be made thereto by those skilled in the art without departing from the basic concept and scope of the invention.

What is claimed is:

1. A mobile wireless device comprising;

a first housing, a second housing, a signal line, a connection portion for connecting the first housing and the second housing so that they can be opened and closed, a circuit board housed in the first housing and including a reference potential layer, and an electronic circuit housed in the second housing and including a wireless unit, wherein the signal line is inserted into the connection portion, one end of which being connected to the electronic circuit, and the other end of which being connected to the circuit board, the first housing has a conductive part arranged at the housing inner surface between the connection portion and the circuit board, and the conductive part is electrically connected to the reference potential layer of the circuit board.

2. A mobile wireless device as set forth in claim 1, wherein the first housing comprises an electronic component receiving power from the circuit board, and the conductive part is a part holder holding the electronic component, fixed to the housing inner surface of the connection portion side end inside the first housing, and having conductivity.

3. A mobile wireless device as set forth in claim 1, wherein the conductive part is a conductive treated part formed at the inner surface of the first housing between the connection portion and the circuit board by coating a conductive paint or depositing a metal film.

4. A mobile wireless device as set forth in claim 1, wherein the first housing comprises an electronic component receiving power from the circuit board, the conductive part has a first conductive part constituted by a conductive treated part formed at the inner surface of the first housing between the connection portion and the circuit board by coating a conductive paint or depositing a metal film and a second conductive part constituted by a part holder holding the electronic component and fixed to the housing inner surface of the connection portion side end inside the first housing, and having conductivity, and the part holder is electrically connected to the conductive treated part.

5. A mobile wireless device as set forth in claim 3, wherein the first housing is constituted by a plurality of case members, one of the circuit board and the conductive treated part comprises a spring contact, and the other comprises a plate contact, the reference potential layer and the conductive treated part are electrically connected by assembling the plurality of case members and making the spring contact and the plate contact contact each other and a direction in which the plurality of case members are assembled matches with a direction raising a contact pressure of the spring contact and the plate contact.

6. A mobile wireless device as set forth in claim 2, wherein the electronic component is a camera.

7. A mobile wireless device as set forth in claim 1, comprising an antenna arranged in the second housing and connected to the wireless unit, wherein the antenna is arranged at a position where it does not overlap with the conductive part when the first housing and the second housing are closed.

8. A mobile wireless device as set forth in claim 1, wherein the connection portion comprises a first hinge portion provided at the first housing and having a hole opening to the inside of the first housing, a second hinge portion provided at the second housing and having a hole opening to the inside of the second housing, and a cylindrical hinge part passed through the hole of the first hinge portion and the second hinge portion, and the signal line in passed through the hinge parts.

9. A mobile wireless device as set forth in claim 1, wherein the signal line is arranged so as to face the conductive part.

10. A mobile wireless device as set forth in claim 1, wherein the first housing is constituted by a plurality of case members, the conductive part is arranged at the inner surface of one of the plurality of case members facing to the second housing when the first housing and the second housing are closed.

* * * * *